(12) United States Patent
Borshevsky et al.

(10) Patent No.: US 12,495,036 B2
(45) Date of Patent: Dec. 9, 2025

(54) CLASSIFYING FORM AND INPUTS FOR PASSWORD AUTOFILL

(71) Applicant: Dropbox, Inc., San Francisco, CA (US)

(72) Inventors: Boris Borshevsky, Tel Aviv (IL); Gilad Gabriel Tsehori, Savyon (IL); Larry Xu, Singapore (SG); Oz Rubin, Tel Aviv (IL)

(73) Assignee: Dropbox, Inc., San Francisco, CA (US)

( * ) Notice: Subject to any disclaimer, the term of this patent is extended or adjusted under 35 U.S.C. 154(b) by 112 days.

(21) Appl. No.: 18/330,969

(22) Filed: Jun. 7, 2023

(65) Prior Publication Data

US 2024/0414151 A1    Dec. 12, 2024

(51) Int. Cl.
*H04L 9/40* (2022.01)
*G06F 40/174* (2020.01)
*G06V 30/412* (2022.01)

(52) U.S. Cl.
CPC .......... *H04L 63/083* (2013.01); *G06F 40/174* (2020.01); *G06V 30/412* (2022.01)

(58) Field of Classification Search
CPC ........ G06F 40/174; G06F 21/31; G06F 21/45; G06F 40/263; H04L 63/083; G06V 30/412
See application file for complete search history.

(56) References Cited

U.S. PATENT DOCUMENTS

| | | | |
|---|---|---|---|
| 7,660,779 B2 | 2/2010 | Goodman et al. | |
| 7,849,398 B2 | 12/2010 | Dabet et al. | |
| 8,713,629 B2 * | 4/2014 | Ku | G06F 21/31 713/168 |
| 9,027,097 B2 * | 5/2015 | Bortz | H04L 63/0807 726/8 |
| 9,111,074 B1 * | 8/2015 | Friedman | G06F 21/41 |
| 9,405,722 B2 | 8/2016 | Topalov et al. | |
| 9,590,980 B2 | 3/2017 | Boss et al. | |
| 9,824,208 B2 * | 11/2017 | Cavanagh | H04L 63/06 |
| 10,133,718 B2 | 11/2018 | Iasi et al. | |
| 10,311,374 B2 | 6/2019 | Shetty et al. | |
| 10,614,266 B2 | 4/2020 | Dakin et al. | |
| 10,628,633 B1 | 4/2020 | Geng et al. | |
| 10,809,915 B2 | 10/2020 | Fang et al. | |
| 11,100,279 B2 | 8/2021 | Chernov et al. | |

(Continued)

OTHER PUBLICATIONS

Notice of Allowance for U.S. Appl. No. 18/330,957 mailed on Feb. 13, 2025, 8 pages.

(Continued)

*Primary Examiner* — Hosuk Song
(74) *Attorney, Agent, or Firm* — Polsinelli PC

(57) ABSTRACT

Embodiments relate to improved classification techniques for classifying form (e.g., webpage) forms and inputs for password auto fill applications. A module may detect a client device accessing a form (e.g., webpage) and may identify inputs of the form (e.g., webpage). The module may group two or more of the identified inputs into a bundle and apply the bundle to one or more machine learned bundle classifier models configured to determine a form type of the bundle. The module may also apply the bundle to the selected input classifier model. The module may automatically fill one or more inputs of the form (e.g., webpage) according to the input types identified by the selected input classifier model.

20 Claims, 8 Drawing Sheets

(56) References Cited

U.S. PATENT DOCUMENTS

| | | |
|---|---|---|
| 11,127,073 B2 | 9/2021 | Walters et al. |
| 11,295,072 B2 | 4/2022 | Sundar et al. |
| 11,341,319 B2 | 5/2022 | Hecht et al. |
| 11,423,209 B2 | 8/2022 | Peterson et al. |
| 11,521,405 B2 | 12/2022 | Singh et al. |
| 11,532,023 B2 | 12/2022 | Senthil |
| 11,544,586 B2 | 1/2023 | Vannoni et al. |
| 11,580,243 B2 * | 2/2023 | Collart .................. G06F 21/604 |
| 11,876,910 B2 * | 1/2024 | Padmanabhan ... G06F 16/24573 |
| 12,199,976 B2 * | 1/2025 | Chavali ................. H04L 63/083 |
| 2008/0235567 A1 | 9/2008 | Raj et al. |
| 2019/0080189 A1 | 3/2019 | Van Os et al. |
| 2020/0065914 A1 | 2/2020 | Pai et al. |
| 2020/0342404 A1 | 10/2020 | Jackson |
| 2021/0342923 A1 | 11/2021 | Walters et al. |
| 2022/0035990 A1 | 2/2022 | Kaza et al. |
| 2022/0083962 A1 | 3/2022 | Galantzan et al. |
| 2022/0198182 A1 | 6/2022 | Semenov et al. |
| 2022/0317839 A1 | 10/2022 | Leme et al. |
| 2022/0377075 A1 | 11/2022 | Lucic |
| 2023/0084751 A1 | 3/2023 | Mondello et al. |
| 2023/0273985 A1 | 8/2023 | Suchan et al. |

OTHER PUBLICATIONS

Non-Final Office Action from U.S. Appl. No. 18/330,957, mailed Sep. 10, 2024, 16 pages.

Fuchs G., et al., "Automatic Form Filling with Form-BERT," Proceedings of the 44th International ACM SIGIR Conference on Research and Development in Information Retrieval, Jul. 2021, pp. 1850-1854.

Lee D., et al., "Intelligent Data Entry Assistant for XML Using Ensemble Learning," Proceedings of the 10th international conference on Intelligent user interfaces, Jan. 2005, pp. 83-89.

Notice of Allowance for U.S. Appl. No. 18/330,957 mailed on Apr. 18, 2025, 9 pages.

* cited by examiner

CLASSIFYING FORM AND INPUTS FOR PASSWORD AUTOFILL

TECHNICAL FIELD

The disclosed embodiments generally relate to improved classification techniques for classifying forms and inputs for password auto fill applications.

BACKGROUND

Conventional password auto fill applications often fail to properly identify webpage forms or inputs of those forms (e.g., text fields). For example, a password auto fill application fails to recognize a webpage as a login page. In another example, the auto fill application fails to recognize a password field in a form, or it improperly identifies a password field as another field type.

SUMMARY

Thus, some embodiments herein relate to improved classification techniques for classifying (e.g., webpage) forms and inputs for password auto fill applications. Some embodiments also relate to correcting errors of classified (e.g., webpage) forms and inputs. Among other advantages, embodiments allow a user to fill out a form quickly and easily (e.g., quickly apply a username and password to the correct inputs), thus allowing the user to quickly and easily access forms (e.g., webpages) associated with their profile. Additionally, some embodiments can identify errors in a form that is incorrectly filled out and apply corrections to the form.

In some embodiments, the techniques described herein relate to an autofill module (e.g., of a content management system) identifying inputs of a form (e.g., webpage), and applying an autofill template to the identified inputs of the form (e.g., webpage), the autofill template specifying input types of the identified inputs and content to be applied to the input types. The autofill module automatically detects an input error, and, responsive to detecting the input error, receives a correction indication specifying a first input of the form (e.g., webpage) and an input type of the first input. The autofill module updates the autofill template according to the correction indication, and applyies the updated autofill template to the first input of the form (e.g., webpage).

In some embodiments, the techniques described herein relate to an autofill module (e.g., of a content management system) detecting a client device accessing a form (e.g., webpage), and identifying inputs of the form (e.g., webpage) to be bundled. The autofill module groups two or more of the identified inputs into a bundle, and applies the bundle to one or more machine learned bundle classifier models configured to determine a form type of the bundle. Based on the determined form type of the bundle, the autofill module selects a machine learned input classifier model from a set of input classifier models trained according to form type. The autofill module applies the bundle to the selected input classifier model, where the selected input classifier model is configured to identify input types of the inputs of the bundle. The autofill module automatically fills one or more inputs of the form (e.g., webpage) according to the input types identified by the selected input classifier model.

The features and advantages described in this summary and the following detailed description are not all-inclusive. Many additional features and advantages will be apparent to one of ordinary skill in the art in view of the drawings, specification, and claims hereof.

Other aspects include components, devices, systems, improvements, methods, processes, applications, computer readable mediums, and other technologies related to any of the above.

The figures depict various example embodiments of the present technology for purposes of illustration only. One skilled in the art will readily recognize from the following description that other alternative example embodiments of the structures and methods illustrated herein may be employed without departing from the principles of the technology described herein.

DETAILED DESCRIPTION

System Overview

Figure 1:
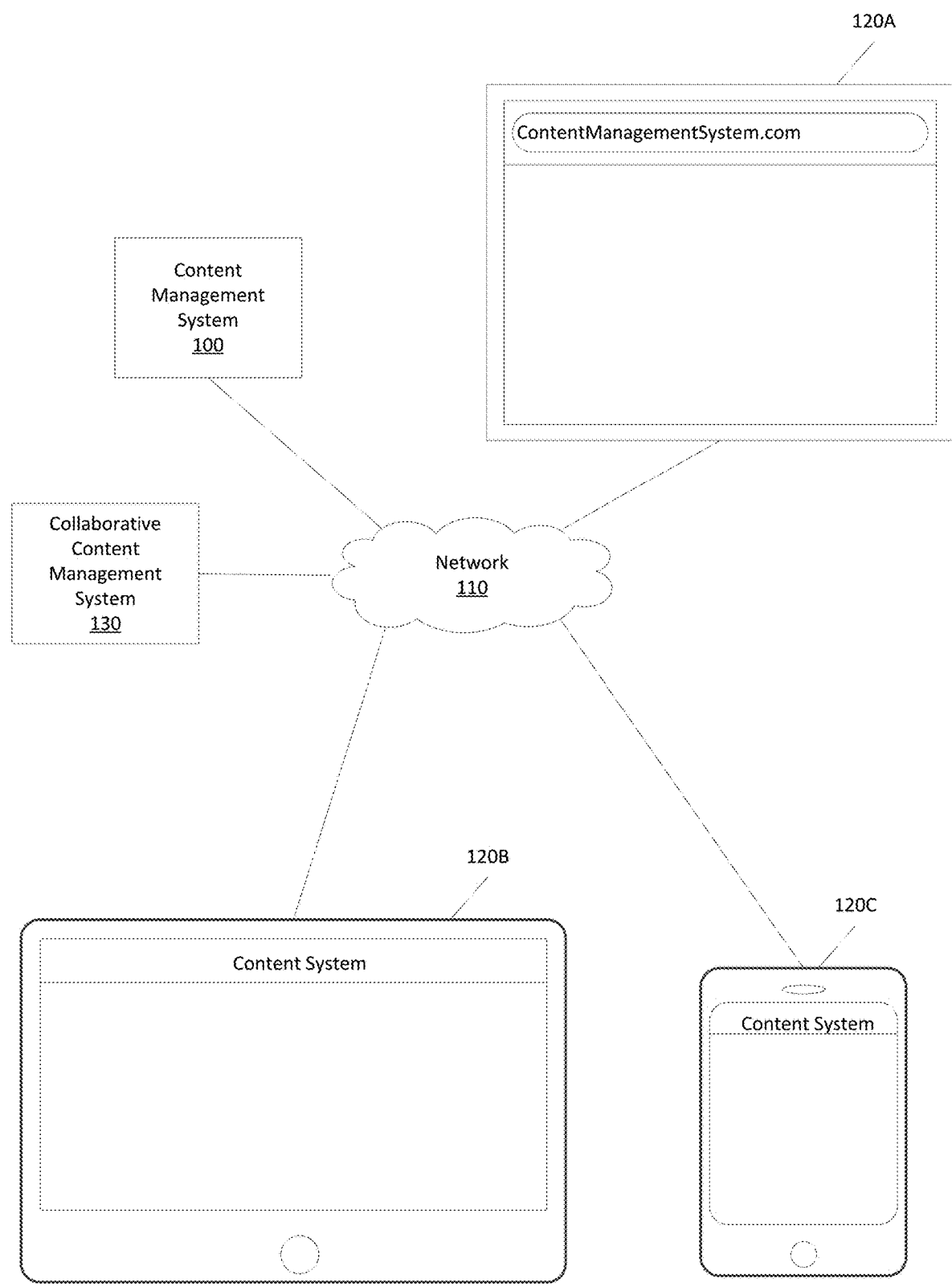
FIG. 1 shows a diagram of a system environment of a content management system and a collaborative content management system, according to example embodiments.

FIG. 1 shows a system environment including content management system 100, collaborative content management system 130, and client devices 120a, 120b, and 120c (collectively or individually "120"). Content management system 100 provides functionality for sharing content items with one or more client devices 120 and synchronizing content items between content management system 100 and one or more client devices 120.

The content stored by content management system 100 can include any type of content items, such as documents, spreadsheets, collaborative content items, text files, audio files, image files, video files, webpages, executable files, binary files, placeholder files that reference other content items, etc. In some implementations, a content item can be a portion of another content item, such as an image that is included in a document. Content items can also include collections, such as folders, namespaces, playlists, albums, etc., that group other content items together. The content stored by content management system 100 may be organized in one configuration in folders, tables, or in other database structures (e.g., object oriented, key/value etc.).

In some example embodiments, the content stored by content management system 100 includes content items created by using third party applications, e.g., word processors, video and image editors, database management systems, spreadsheet applications, code editors, and so forth, which are independent of content management system 100.

In some example embodiments, content stored by content management system 100 includes content items, e.g., collaborative content items, created using a collaborative interface provided by collaborative content management system 130. In various implementations, collaborative content items can be stored by collaborative content item management system 130, with content management system 100, or external to content management system 100. A collaborative interface can provide an interactive content item collaborative platform whereby multiple users can simultaneously create and edit collaborative content items, comment in the collaborative content items, and manage tasks within the collaborative content items.

Users may create accounts at content management system 100 and store content thereon by sending such content from client device 120 to content management system 100. The content can be provided by users and associated with user accounts that may have various privileges. For example, privileges can include permissions to: see content item titles, see other metadata for the content item (e.g. location data, access history, version history, creation/modification dates, comments, file hierarchies, etc.), read content item contents, modify content item metadata, modify content of a content item, comment on a content item, read comments by others on a content item, or grant or remove content item permissions for other users.

Client devices 120 communicate with content management system 100 and collaborative content management system 130 through network 110. The network may be any suitable communications network for data transmission. In some example embodiments, network 110 is the Internet and uses standard communications technologies and/or protocols. Thus, network 110 can include links using technologies such as Ethernet, 802.11, worldwide interoperability for microwave access (WiMAX), 3G, 4G, digital subscriber line (DSL), asynchronous transfer mode (ATM), InfiniBand, PCI Express Advanced Switching, etc. Similarly, the networking protocols used on network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over network 110 can be represented using technologies and/or formats including the hypertext markup language (HTML), the extensible markup language (XML), JavaScript Object Notation (JSON), etc. In addition, all or some of links can be encrypted using conventional encryption technologies such as the secure sockets layer (SSL), transport layer security (TLS), virtual private networks (VPNs), Internet Protocol security (IPsec), etc. In some example embodiments, the entities use custom and/or dedicated data communications technologies instead of, or in addition to, the ones described above.

In some example embodiments, content management system 100 and collaborative content management system 130 are combined into a single system. The system may include one or more servers configured to provide the functionality discussed herein for the systems 100 and 130.

Client Device

Figure 2:
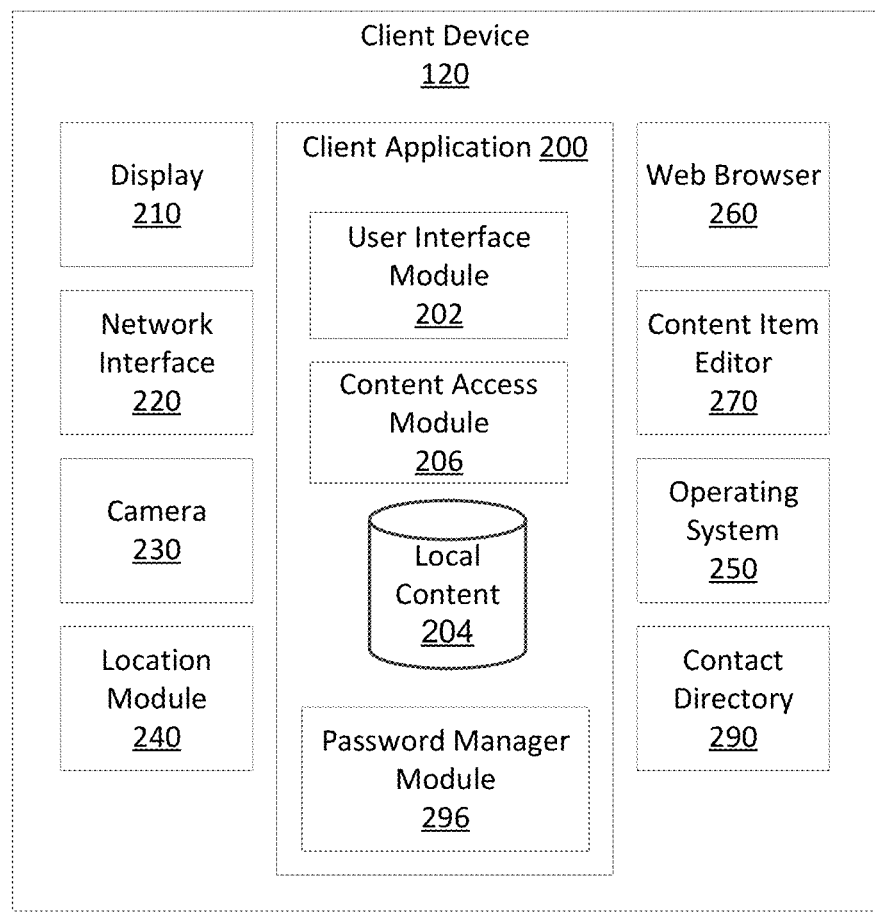
FIG. 2 shows a block diagram of components of a client device, according to example embodiments.

FIG. 2 shows a block diagram of the components of a client device 120 according to example embodiments. Client devices 120 generally include devices and modules for communicating with content management system 100 and a user of client device 120. Client device 120 includes display 210 for providing information to the user, and in certain client devices 120 includes a touchscreen. Client device 120 also includes network interface 220 for communicating with content management system 100 via network 110. There are additional components that may be included in client device 120 but that are not shown, for example, one or more computer processors, local fixed memory (RAM and ROM), as well as optionally removable memory (e.g., SD-card), power sources, and audio-video outputs.

In certain example embodiments, client device 120 includes additional components such as camera 230 and location module 240. Location module 240 determines the location of client device 120, using, for example, a global positioning satellite signal, cellular tower triangulation, or other methods. Location module 240 may be used by client application 200 to obtain location data and add the location data to metadata about a content item.

Client devices 120 maintain various types of components and modules for operating the client device and accessing content management system 100. The software modules can include operating system 250 or a collaborative content item editor 270. Collaborative content item editor 270 is configured for creating, viewing and modifying collaborative content items such as text documents, code files, mixed media files (e.g., text and graphics), presentations or the like. Operating system 250 on each device provides a local file management system and executes the various software modules such as content management system client application 200 and collaborative content item editor 270. A contact directory 290 stores information on the user's contacts, such as name, telephone numbers, company, email addresses, physical address, website URLs, and the like.

Client devices 120 access content management system 100 and collaborative content management system 130 in a variety of ways. Client device 120 may access these systems through a native application or software module, such as content management system client application 200. Client device 120 may also access content management system 100 through web browser 260. As an alternative, the client application 200 may integrate access to content management system 100 with the local file management system provided by operating system 250. When access to content management system 100 is integrated in the local file management system, a file organization scheme maintained at the content management system is represented at the client device 120 as a local file structure by operating system 250 in conjunction with client application 200.

Client application 200 manages access to content management system 100 and collaborative content management system 130. Client application 200 includes user interface module 202 that generates an interface to the content accessed by client application 200 and is one means for performing this function. The generated interface is provided to the user by display 210. Client application 200 may store content accessed from a content storage at content management system 100 in local content 204. While represented here as within client application 200, local content 204 may be stored with other data for client device 120 in non-volatile storage. When local content 204 is stored this way, the content is available to the user and other applications or modules, such as collaborative content item editor 270, when client application 200 is not in communication with content management system 100. Content access module 206 manages updates to local content 204 and communicates with content management system 100 to synchronize content modified by client device 120 with content maintained on content management system 100, and is one means for performing this function. Client application 200 may take various forms, such as a stand-alone application, an application plug-in, or a browser extension. In some embodiments, the client application 200 includes password manager module 296 configured to manage passwords for a user of the client device 120. For example, the password manager module 296 can store usernames and passwords for a user; automatically fill out a form with a username and password; and identify errors in a form that is already filled out. An example password manager module 296 is further described with reference to FIG. 5.

Content Management System

Figure 3:
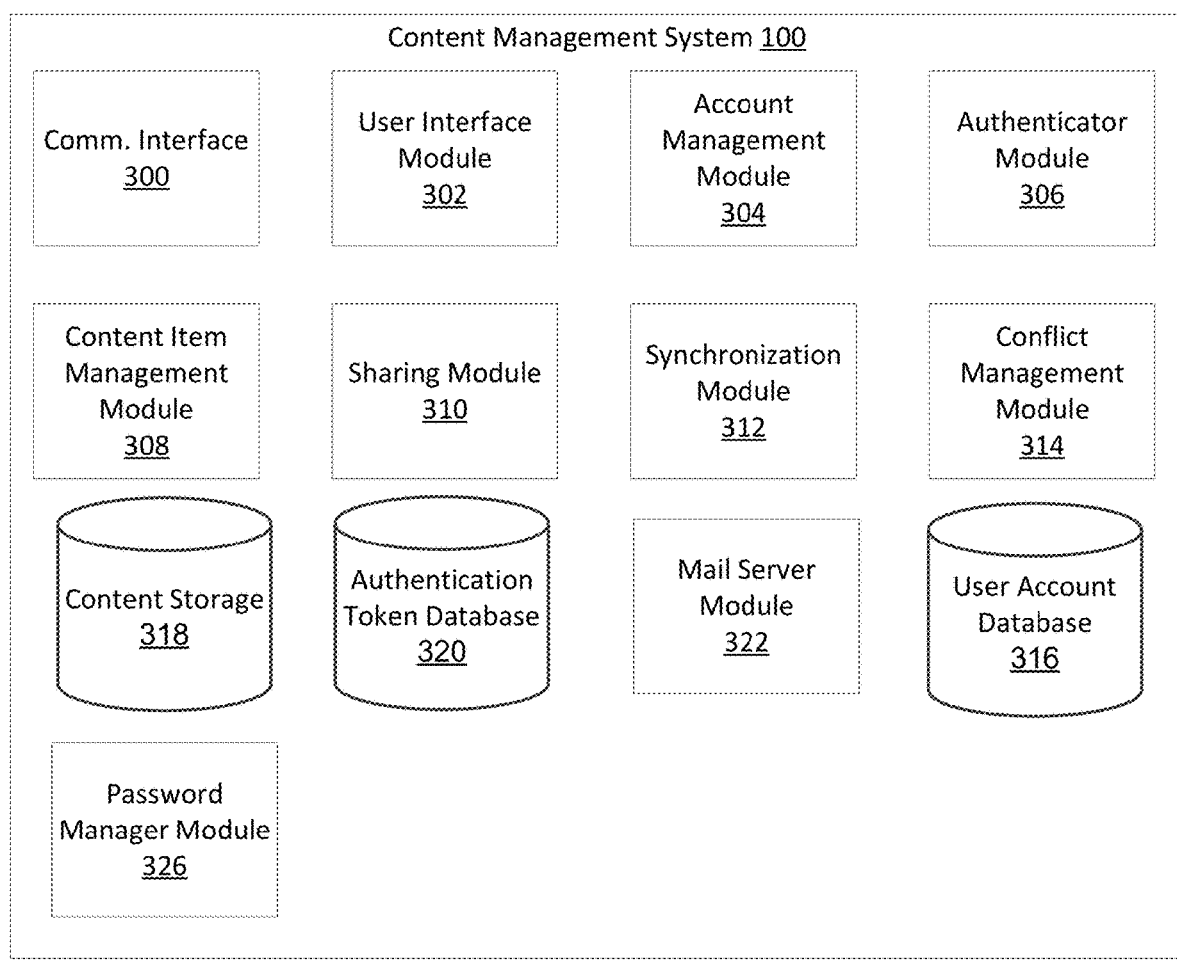
FIG. 3 shows a block diagram of a content management system, according to example embodiments.

FIG. 3 shows a block diagram of the content management system 100 according to example embodiments. To facilitate the various content management services, a user can create an account with content management system 100. The account information can be maintained in user account database 316, and is one means for performing this function. User account database 316 can store profile information for registered users. In some cases, the only personal information in the user profile is a username and/or email address. However, content management system 100 can also be configured to accept additional user information, such as password recovery information, demographics information, payment information, and other details. Each user is associated with a userID and a user name. For purposes of convenience, references herein to information such as collaborative content items or other data being "associated" with a user are understood to mean an association between a collaborative content item and either of the above forms of user identifier for the user. Similarly, data processing operations on collaborative content items and users are understood to be operations performed on derivative identifiers such as collaborativeContentItemID and userIDs. For example, a user may be associated with a collaborative content item by storing the information linking the userID and the collaborativeContentItemID in a table, file, or other storage formats. For example, a database table organized by collaborativeContentItemIDs can include a column listing the userID of each user associated with the collaborative content item. As another example, for each userID, a file can list a set of collaborativeContentItemID associated with the user. As another example, a single file can list key values pairs such as <userID, collaborativeContentItemID> representing the association between an individual user and a collaborative content item. The same types of mechanisms can be used to associate users with comments, threads, text elements, formatting attributes, and the like.

User account database 316 can also include account management information, such as account type, e.g. free or paid; usage information for each user, e.g., file usage history; maximum storage space authorized; storage space used; content storage locations; security settings; personal configuration settings; content sharing data; etc. Account management module 304 can be configured to update and/or obtain user account details in user account database 316. Account management module 304 can be configured to interact with any number of other modules in content management system 100.

An account can be used to store content items, such as collaborative content items, audio files, video files, etc., from one or more client devices associated with the account. Content items can be shared with multiple users and/or user accounts. In some implementations, sharing a content item can include associating, using sharing module 310, the content item with two or more user accounts and providing for user permissions so that a user that has authenticated into one of the associated user accounts has a specified level of access to the content item. That is, the content items can be shared across multiple client devices of varying type, capabilities, operating systems, etc. The content items can also be shared across varying types of user accounts.

Individual users can be assigned different access privileges to a content item shared with them, as discussed above. In some cases, a user's permissions for a content item can be explicitly set for that user. A user's permissions can also be set based on: a type or category associated with the user (e.g., elevated permissions for administrator users or manager), the user's inclusion in a group or being identified as part of an organization (e.g., specified permissions for all members of a particular team), and/or a mechanism or context of a user's accesses to a content item (e.g., different permissions based on where the user is, what network the user is on, what type of program or API the user is accessing, whether the user clicked a link to the content item, etc.). Additionally, permissions can be set by default for users, user types/groups, or for various access mechanisms and contexts.

In some implementations, shared content items can be accessible to a recipient user without requiring authentication into a user account. This can include sharing module 310 providing access to a content item through activation of a link associated with the content item or providing access through a globally accessible shared folder.

The content can be stored in content storage 318, which is one means for performing this function. Content storage 318 can be a storage device, multiple storage devices, or a server. Alternatively, content storage 318 can be a cloud storage provider or network storage accessible via one or more communications networks. In one configuration, content management system 100 stores the content items in the same organizational structure as they appear on the client device. However, content management system 100 can store the content items in its own order, arrangement, or hierarchy.

Content storage 318 can also store metadata describing content items, content item types, and the relationship of content items to various accounts, folders, or groups. The metadata for a content item can be stored as part of the content item or can be stored separately. In one configuration, each content item stored in content storage 318 can be assigned a system-wide unique identifier.

Content storage 318 can decrease the amount of storage space required by identifying duplicate files or duplicate segments of files. Instead of storing multiple copies of an identical content item, content storage 318 can store a single copy and then use a pointer or other mechanism to link the duplicates to the single copy. Similarly, content storage 318 stores files using a file version control mechanism that tracks changes to files, different versions of files (such as a diverging version tree), and a change history. The change history can include a set of changes that, when applied to the original file version, produces the changed file version.

Content management system 100 automatically synchronizes content from one or more client devices, using synchronization module 312, which is one means for performing this function. The synchronization is platform agnostic. That is, the content is synchronized across multiple client devices 120 of varying type, capabilities, operating systems, etc. For example, client application 200 synchronizes, via synchronization module 312 at content management system 100, content in client device 120's file system with the content in an associated user account on system 100. Client application 200 synchronizes any changes to content in a designated folder and its sub-folders with the synchronization module 312. Such changes include new, deleted, modified, copied, or moved files or folders. Synchronization module 312 also provides any changes to content associated with client device 120 to client application 200. This synchronizes the local content at client device 120 with the content items at content management system 100.

Conflict management module 314 determines whether there are any discrepancies between versions of a content item located at different client devices 120. For example, when a content item is modified at one client device and a second client device, differing versions of the content item may exist at each client device. Synchronization module 312 determines such versioning conflicts, for example by identifying the modification time of the content item modifications. Conflict management module 314 resolves the conflict between versions by any suitable means, such as by merging the versions, or by notifying the client device of the later-submitted version.

A user can also view or manipulate content via a web interface generated by user interface module 302. For example, the user can navigate in web browser 260 to a web address provided by content management system 100. Changes or updates to content in content storage 318 made through the web interface, such as uploading a new version of a file, are synchronized back to other client devices 120 associated with the user's account. Multiple client devices 120 may be associated with a single account and files in the account are synchronized between each of the multiple client devices 120.

Content management system 100 includes communications interface 300 for interfacing with various client devices 120, and with other content and/or service providers via an Application Programming Interface (API), which is one means for performing this function. Certain software applications access content storage 318 via an API on behalf of a user. For example, a software package, such as an app on a smartphone or tablet computing device, can programmatically make calls directly to content management system 100, when a user provides credentials, to read, write, create, delete, share, or otherwise manipulate content. Similarly, the API can allow users to access all or part of content storage 318 through a web site.

Content management system 100 can also include authenticator module 306, which verifies user credentials, security tokens, API calls, specific client devices, etc., to determine whether access to requested content items is authorized, and is one means for performing this function. Authenticator module 306 can generate one-time use authentication tokens for a user account. Authenticator module 306 assigns an expiration period or date to each authentication token. In addition to sending the authentication tokens to requesting client devices, authenticator module 306 can store generated authentication tokens in authentication token database 320. After receiving a request to validate an authentication token, authenticator module 306 checks authentication token database 320 for a matching authentication token assigned to the user. Once the authenticator module 306 identifies a matching authentication token, authenticator module 306 determines if the matching authentication token is still valid. For example, authenticator module 306 verifies that the authentication token has not expired or was not marked as used or invalid. After validating an authentication token, authenticator module 306 may invalidate the matching authentication token, such as a single-use token. For example, authenticator module 306 can mark the matching authentication token as used or invalid, or delete the matching authentication token from authentication token database 320.

In some example embodiments, content management system 100 includes a content management module 308 for maintaining a content directory that identifies the location of each content item in content storage 318, and allows client applications to request access to content items in the storage 318, and which is one means for performing this function. A content entry in the content directory can also include a content pointer that identifies the location of the content item in content storage 318. For example, the content entry can include a content pointer designating the storage address of the content item in memory. In some example embodiments, the content entry includes multiple content pointers that point to multiple locations, each of which contains a portion of the content item.

In addition to a content path and content pointer, a content entry in some configurations also includes user account identifier that identifies the user account that has access to the content item. In some example embodiments, multiple user account identifiers can be associated with a single content entry indicating that the content item has shared access by the multiple user accounts.

In some example embodiments, the content management system 100 can include a mail server module 322. The mail server module 322 can send (and receive) collaborative content items to (and from) other client devices using the collaborative content management system 100. The mail server module can also be used to send and receive messages between users in the content management system.

In some embodiments, the content management system 100 includes a password manager 326. An example password manager is further described with reference to FIG. 5.

Collaborative Content Management System

Figure 4:
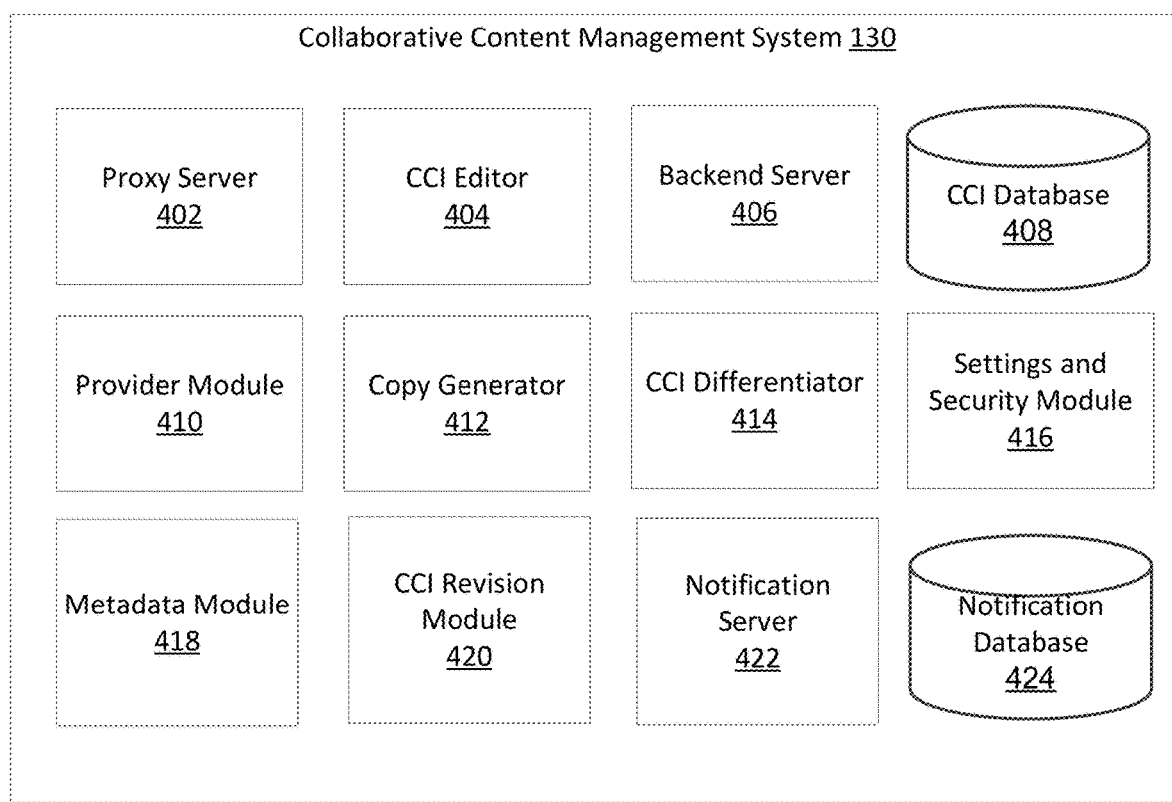
FIG. 4 shows a block diagram of a collaborative content management system, according to example embodiments.

FIG. 4 shows a block diagram of the collaborative content management system 130, according to example embodiments. Collaborative content items can be files that users can create and edit using a collaborative content items editor 270 and can contain collaborative content item elements. Collaborative content item elements may include any type of content such as text; images, animations, videos, audio, or other multi-media; tables; lists; references to external content; programming code; tasks; tags or labels; comments; or any other type of content. Collaborative content item elements can be associated with an author identifier, attributes, interaction information, comments, sharing users, etc. Collaborative content item elements can be stored as database entities, which allows for searching and retrieving the collaborative content items. As with other types of content items, collaborative content items may be shared and synchronized with multiple users and client devices 120, using sharing 310 and synchronization 312 modules of content management system 100. Users operate client devices 120 to create and edit collaborative content items, and to share collaborative content items with other users of client devices 120. Changes to a collaborative content item by one client device 120 are propagated to other client devices 120 of users associated with that collaborative content item.

In example embodiments of FIG. 1, collaborative content management system 130 is shown as separate from content management system 100 and can communicate with it to obtain its services. In other example embodiments, collaborative content management system 130 is a subsystem of the component of content management system 100 that provides sharing and collaborative services for various types of content items. User account database 316 and authentication token database 320 from content management system 100 are used for accessing collaborative content management system 130 described herein.

Collaborative content management system 130 can include various servers for managing access and edits to collaborative content items and for managing notifications about certain changes made to collaborative content items. Collaborative content management system 130 can include proxy server 402, collaborative content item editor 404, backend server 406, and collaborative content item database 408, access link module 410, copy generator 412, collaborative content item differentiator 414, settings module 416, metadata module 418, revision module 420, notification server 422, and notification database 424. Proxy server 402 handles requests from client applications 200 and passes those requests to the collaborative content item editor 404. Collaborative content item editor 404 manages application level requests for client applications 200 for editing and creating collaborative content items, and selectively interacts with backend servers 406 for processing lower level processing tasks on collaborative content items, and interfacing with collaborative content items database 408 as needed. Collaborative content items database 408 contains a plurality of database objects representing collaborative content items, comment threads, and comments. Each of the database objects can be associated with a content pointer indicating the location of each object within the CCI database 408. Notification server 422 detects actions performed on collaborative content items that trigger notifications, creates notifications in notification database 424, and sends notifications to client devices.

Client application 200 sends a request relating to a collaborative content item to proxy server 402. Generally, a request indicates the userID ("UID") of the user, and the collaborativeContentItemID ("NID") of the collaborative content item, and additional contextual information as appropriate, such as the text of the collaborative content item. When proxy server 402 receives the request, the proxy server 402 passes the request to the collaborative content item editor 404. Proxy server 402 also returns a reference to the identified collaborative content items proxy server 402 to client application 200, so the client application can directly communicate with the collaborative content item editor 404 for future requests. In alternative example embodiments, client application 200 initially communicates directly with a specific collaborative content item editor 404 assigned to the userID.

When collaborative content item editor 404 receives a request, it determines whether the request can be executed directly or by a backend server 406. When the request adds, edits, or otherwise modifies a collaborative content item the request is handled by the collaborative content item editor 404. If the request is directed to a database or index inquiry, the request is executed by a backend server 406. For example, a request from client device 120 to view a collaborative content item or obtain a list of collaborative content items responsive to a search term is processed by backend server 406.

The access module 410 receives a request to provide a collaborative content item to a client device. In some example embodiments, the access module generates an access link to the collaborative content item, for instance in response to a request to share the collaborative content item by an author. The access link can be a hyperlink including or associated with the identification information of the CCI (i.e., unique identifier, content pointer, etc.). The hyperlink can also include any type of relevant metadata within the content management system (i.e., author, recipient, time created, etc.). In some example embodiments, the access module can also provide the access link to user accounts via the network 110, while in other example embodiments the access link can be provided or made accessible to a user account and is accessed through a user account via the client device. In some example embodiments, the access link will be a hyperlink to a landing page (e.g., a webpage, a digital store front, an application login, etc.) and activating the hyperlink opens the landing page on a client device. The landing page can allow client devices not associated with a user account to create a user account and access the collaborative content item using the identification information associated with the access link. Additionally, the access link module can insert metadata into the collaborative content item, associate metadata with the collaborative content item, or access metadata associated with the collaborative content item that is requested.

The access module 410 can also provide collaborative content items via other methods. For example, the access module 410 can directly send a collaborative content item to a client device or user account, store a collaborative content item in a database accessible to the client device, interact with any module of the collaborative content management system to provide modified versions of collaborative content items (e.g., the copy generator 412, the CCI differentiator 414, etc.), sending content pointer associated with the collaborative content item, sending metadata associated with the collaborative content item, or any other method of providing collaborative content items between devices in the network. The access module can also provide collaborative content items via a search of the collaborative content item database (i.e., search by a keyword associated with the collaborative content item, the title, or a metadata tag, etc.).

The copy generator 412 can duplicate a collaborative content item. Generally, the copy generator duplicates a collaborative content item when a client device selects an access link associated with the collaborative content item. The copy generator 412 accesses the collaborative content item associated with the access link and creates a derivative copy of the collaborative content item for every request received. The copy generator 412 stores each derivative copy of the collaborative content item in the collaborative content item database 408. Generally, each copy of the collaborative content item that is generated by the copy generator 412 is associated with both the client device from which the request was received and the user account associated with the client device requesting the copy. When the copy of the collaborative content item is generated it can create a new unique identifier and content pointer for the copy of the collaborative content item. Additionally, the copy generator 412 can insert metadata into the collaborative content item, associate metadata with the copied collaborative content item, or access metadata associated with the collaborative content item that was requested to be copied.

The collaborative content item differentiator 414 determines the difference between two collaborative content items. In some example embodiments, the collaborative content item differentiator 414 determines the difference between two collaborative content items when a client device selects an access hyperlink and accesses a collaborative content item that the client device has previously used the copy generator 412 to create a derivative copy. The content item differentiator can indicate the differences between the content elements of the compared collaborative content items. The collaborative content item differentiator 414 can create a collaborative content item that includes the differences between the two collaborative content items, i.e. a differential collaborative content item. In some example embodiments, the collaborative content item differentiator provides the differential collaborative content item to a requesting client device 120. The differentiator 414 can store the differential collaborative content item in the collaborative content item database 408 and generate identification information for the differential collaborative content item. Additionally, the differentiator 414 can insert metadata into the accessed and created collaborative content items, associate metadata with the accessed and created collaborative content item, or access metadata associated with the collaborative content items that were requested to be differentiated.

The settings and security module 416 can manage security during interactions between client devices 120, the content management system 100, and the collaborative content management system 130. Additionally, the settings and security module 416 can manage security during interactions between modules of the collaborative content management system. For example, when a client device 120 attempts to interact within any module of the collaborative content management system 100, the settings and security module 416 can manage the interaction by limiting or disallowing the interaction. Similarly, the settings and security module 416 can limit or disallow interactions between modules of the collaborative content management system 130. Generally, the settings and security module 416 accesses metadata associated with the modules, systems 100 and 130, devices 120, user accounts, and collaborative content items to determine the security actions to take. Security actions can include: requiring authentication of client devices 120 and user accounts, requiring passwords for content items, removing metadata from collaborative content items, preventing collaborative content items from being edited, revised, saved or copied, or any other security similar security action. Additionally, settings and security module can access, add, edit or delete any type of metadata associated with any element of content management system 100, collaborative content management system 130, client devices 120, or collaborative content items.

The metadata module 418 manages metadata within with the collaborative content management system. Generally, metadata can take three forms within the collaborative content management system: internal metadata, external metadata, and device metadata. Internal metadata is metadata within a collaborative content item, external metadata is metadata associated with a CCI but not included or stored within the CCI itself, and device metadata is associated with client devices. At any point the metadata module can manage metadata by changing, adding, or removing metadata.

Some examples of internal metadata can be: identifying information within collaborative content items (e.g., email addresses, names, addresses, phone numbers, social security numbers, account or credit card numbers, etc.); metadata associated with content elements (e.g., location, time created, content element type; content element size; content element duration, etc.); comments associated with content elements (e.g., a comment giving the definition of a word in a collaborative content item and its attribution to the user account that made the comment); or any other metadata that can be contained within a collaborative content item.

Some examples of external metadata can be: content tags indicating categories for the metadata; user accounts associated with a CCI (e.g., author user account, editing user account, accessing user account etc.); historical information (e.g., previous versions, access times, edit times, author times, etc.); security settings; identifying information (e.g., unique identifier, content pointer); collaborative content management system 130 settings; user account settings; or any other metadata that can be associated with the collaborative content item.

Some examples of device metadata can be: device type; device connectivity; device size; device functionality; device sound and display settings; device location; user accounts associated with the device; device security settings; or any other type of metadata that can be associated with a client device 120.

The collaborative content item revision module 420 manages application level requests for client applications 200 for revising differntial collaborative content items and selectively interacts with backend servers 406 for processing lower level processing tasks on collaborative content items, and interfacing with collaborative content items database 408 as needed. The revision module can create a revised collaborative content item that is some combination of the content elements from the differential collaborative content item. The revision module 420 can store the revised collaborative content item in the collaborative content item database or provide the revised collaborative content item to a client device 120. Additionally, the revision module 420 can insert metadata into the accessed and created collaborative content items, associate metadata with the accessed and created collaborative content item, or access metadata associated with the collaborative content items that were requested to be differentiated.

Content management system 100 and collaborative content management system 130 may be implemented using a single computer, or a network of computers, including cloud-based computer implementations. The operations of content management system 100 and collaborative content management system 130 as described herein can be controlled through either hardware or through computer programs installed in computer storage and executed by the processors of such server to perform the functions described herein. These systems include other hardware elements necessary for the operations described here, including network interfaces and protocols, input devices for data entry, and output devices for display, printing, or other presentations of data, but which are not described herein. Similarly, conventional elements, such as firewalls, load balancers, collaborative content items servers, failover servers, network management tools and so forth are not shown so as not to obscure the features of the system. Finally, the functions and operations of content management system 100 and collaborative content management system 130 are sufficiently complex as to require implementation on a computer system, and cannot be performed in the human mind simply by mental steps.

Password Manager

Figure 5:
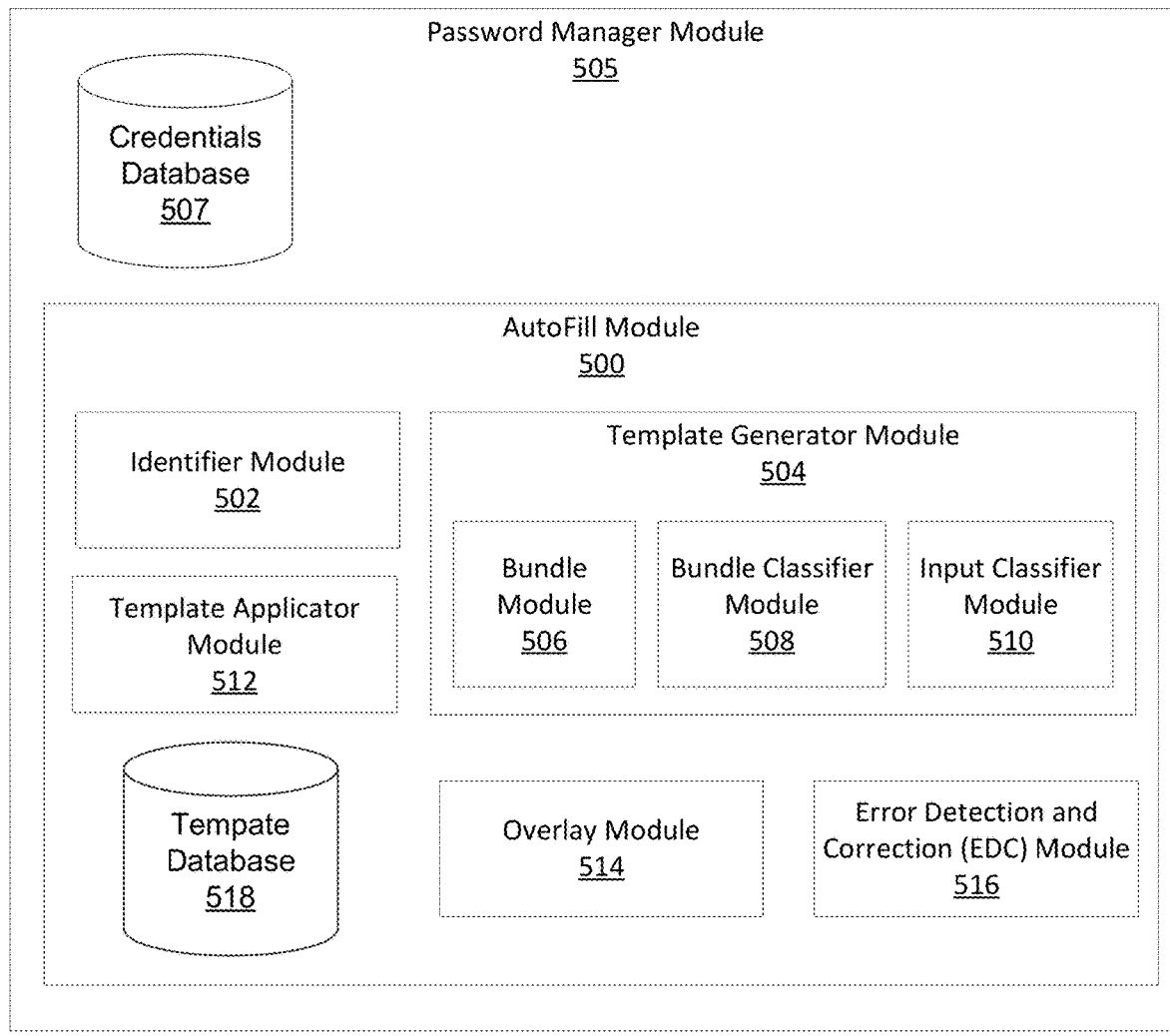
FIG. 5 is a block diagram of an autofill module, according to example embodiments.

In some embodiments, a content management system 100 or a client application 200 (of a client device 120) includes a password manager module 296, 326. FIG. 5 is a block diagram of a password manager module 505, according to some embodiments. In the example of FIG. 5, the password manager module 505 includes a credentials database 507 and an autofill module 500, however the password manager module 505 can include additional, fewer, or different components than illustrated. For example, the credentials database 507 and the template database 518 may be a single database that stores credentials and templates.

As the name suggests, the password manager 505 can store and manage login credentials (e.g., usernames and passwords) for one or more users. This may allow a user to log into a website or mobile application easily and conveniently without remembering their login credentials or manually entering those credentials into inputs of a form. The password manager module 505 may receive login credentials directly from a user in an interface (e.g., via the user interface module 202 or user interface module 302). For example, a user provides a login credentials associated with a website. Additionally, or alternatively, the password manager module 505 may identify and store login credentials when a user inputs them into a form on website or mobile application (pending user permissions).

Login credentials may be stored in a credentials database 507. The credentials in the credentials database may be retrieved to fille one or more inputs of a form. Depending on the implementation, the credentials database 507 may store credentials associated with a single user or multiple users. For example, if the autofill module 500 is stored on a client application 200 of a user's client device 120, the credentials database 507 may store credentials associated with that user but if the autofill module 500 is stored on the content management system 100, the credentials database 507 may store credentials associated with multiple users.

The autofill module 500 allows a user (e.g., using a client application 200) to fill out a form quickly and easily (e.g., quickly apply a username and password to the correct inputs), thus allowing the user to quickly and easily access forms (e.g., webpages) associated with their profile (e.g., log into their account). Additionally, in some embodiments, the autofill module 500 can identify errors in a form that is incorrectly filled out and apply corrections to the form. In embodiments where the autofill module 500 is part of the content management system 100, a client application 200 accessing a form (e.g., webpage) may remotely communicate with the autofill module 500 (e.g., via network 110). The autofill module 500 may include additional, fewer, or different components than illustrated. Furthermore, in some embodiments, the autofill module 500 or components of the autofill module 500 may be on a client application 200. For example, a client application 200 may include a template applicator module 512 for applying templates to formz (e.g., webpages).

As used herein a form is an interactable webpage or mobile application. A form type specifies a type of a form. Forms include one or more inputs. Inputs are fields, buttons, or elements in a form that allow a user to interact with the form. For example, a user (or the autofill module 500) can interact with a form by providing text to a field or selecting a button or element in the form. Example forms types include a login form, a signup form, and a change password form. A login form includes inputs that allow a user to login to their account (e.g., associated with that webpage). A signup form includes inputs that allow a user to create an account. A change password form includes inputs that allow a user to change a password associated with their account. Example input types in a form include a username field and a password field. A username field is configured to receive a username of an account, and a password field is configured to receive a password of an account.

The identifier module 502 identifies inputs of a form accessed by a client device 120. More specifically, the identifier module 502 analyzes the form (e.g., webpage) and identifies one or more inputs. In some embodiments, the identifier model identifies inputs of a webpage by analyzing HyperText Markup Language (HTML) code of the webpage. For example, the identifier module 502 traverses the HTML tree to find inputs (e.g., the HTML code may include syntax that explicitly specifies inputs). In some cases, the HTML codes specifies input types as well. For example, the HTML code of a webpage may include syntax stating an input is a password field or username field. If a password field is explicitly identified in the code but a corresponding username field isn't, the identifier model may traverse the tree to find the nearest field input in the tree and classify that field input as the corresponding username field. In cases where input types are determined, these input types may be provided to the input classifier module 510.

The template generator module 504 generates autofill templates (also "templates"). A template may be associated with a specific webpage (e.g., URL), domain name, or mobile application. As used herein, a template is a data structure that may specify or identify inputs of a form, input types of those inputs, and content to be applied to those inputs according to the input types. A template may also specify locations of the inputs in the form. Thus, a template can be applied to an associated webpage or mobile application (e.g., by the template applicator module 512) to automatically fill one or more inputs of a webpage. The content specified by a template to be applied to the inputs may include user credential information (e.g., username and password) associated with the input types specified by the autofill template. For example, filling one or more inputs of a webpage comprises retrieving credential information associated with the known input types from the credentials database 507 and providing the retrieved user profile information to the one or more inputs of the webpage. A template may be generated by the template generator module 504 and stored (e.g., in the template database 518) for every webpage, domain name, or mobile application associated with credential information in the credentials database 507. If the template database 518 doesn't include a template for a website/domain name/mobile application associated with credential information in the template database 518, the template generator module 504 may generate a template the next time that website/domain name/mobile application is accessed. Additionally, or alternatively, the template generator module 504 may generate a template responsive to a user instruction or when credential information is (e.g., manually) entered into a website or mobile application.

In the example of FIG. 5, the template generator module 504 includes a bundle module 506, a bundle classifier module 508, and an input classifier module 510. The bundle module 506 groups inputs into a bundle, the bundle classifier module 508 determines a form type of the bundle, and the input classifier module 510 determines input types of inputs in the bundle (these modules are further described below). Among other advantages, determining a form type of a bundle first increases the accuracy of the template generator module 504. More specifically, since different form types tend to have different types of inputs, knowing the form type of a bundle first may be helpful in determining the input types of the bundle (compared to determining input types prior to determining the form type).

The bundle module 506 groups two or more of inputs (e.g., identified by the identifier module 502) of a form (e.g., webpage) into a bundle. A bundle is a group of inputs that may represent a form. The bundle module 506 may group inputs within the same HTML <form> element. Inputs not contained within any <form> element may be bundled together based on heuristics (e.g., bundling a password input with its nearest text input and button in the DOM tree) In some embodiments, the bundle module 506 is implemented by a machine learned grouping model. Among other advantages, examining inputs as a bundle may provide additional insight for identifying the form type of a form compared to examining the inputs in isolation.

The bundle classifier module 508 determines a form type of a bundle (e.g., formed by bundle module 506) by applying a bundle to a bundle classifier model. For example, the bundle classifier model determines a bundle is a part of a login form, a signup form, or a change password form. A bundle classifier model may determine a form type based on a set of heuristics. Since some heuristics may be more informative than others, the set of heuristics may be analyzed in sequence according to ranking or relevancy. For example, if analyzing a given heuristic returns a definitive form type (e.g., the confidence level is above a threshold), the bundle classifier model classifies the bundle according to that form type and doesn't analyze the remaining heuristics. Conversely, if analyzing a given heuristic doesn't return a definitive from type (e.g., the confidence level is below the threshold), the bundle classifier analyzes the next heuristic in the set based on the ranking or relevancy. A first example is a "field count heuristic" that counts the number of username fields in a bundle and the number of password fields in a bundle. For example, if there are two password fields, then the bundle is likely part of a signup form. In another example, if there are three password fields, then the bundle likely part of a change password form. Another example heuristic is a "form markup heuristic" that analyzes the HTML markup language to detemine the form type. Specifically, the form markup heuristic performs regex (regular expression) matching with predetermined terms to determine a form type. Example predetermined terms for a login form include: "login," "sign in," "sign on," and "log on." In general, performing regex matching with HTML markup language is preferred compared to text on the webpage since that text may be rendered in different languages across different languages.

In some embodiments, the bundle classifier module 508 can access multiple bundle classifier models, where the bundle classifier models are configured to (e.g., trained to) identify different form types. For example, the bundle classifier module 508 includes a set of models including a first bundle classifier model trained to identify login form types, a second bundle classifier model trained to identify signup form types, a third bundle classifier model trained to identify change password form types, or some combination thereof. In embodiments where the bundle classifier module 508 can access multiple bundle classifier models, a bundle may be applied to multiple bundle classifier models to increase the confidence of the determined form type (e.g., the form type is based on the aggregated output of the bundle classifier models).

As mentioned above, a bundle classifier model may be machine learned. For example, a bundle classifier model is trained using labeled webpages. Specifically, the training data includes forms, where inputs of the forms are bundled together. Additionally, the bundles include labels that indicate the form types of the forms. For example, a bundle classifier model may be trained based on the above training data to determine whether a bundle of inputs corresponds to a login form, signup form, change password form, or none of those form types. If multiple bundle classifier models are trained, they may be trained according to form type. For example, a first bundle classifier model may be trained to determine the likelihoods of a bundle corresponding to a login form, a second bundle classifier model may be trained to determine the likelihood of a bundle corresponding to a signup form, a third bundle classifier model may be trained to determine the likelihood of a bundle corresponding to a change password form, or some combination thereof.

The input classifier module 510 determines input types of inputs in a bundle, such as a username field, a password field, and a submit button. The input classifier module 510 may determine input types based on the form type of the bundle (e.g., determined by the bundle classifier module 508). Specifically, the input classifier module determines input types of a bundle by applying the bundle to an input classifier model. For example, the input classifier model identifies an input (of a bundle) as a username field or a password field (e.g., based on the form type of that bundle).

In some embodiments, the input classifier module 510 has access to multiple input classifier models, where the input classifier models are configured to (e.g., trained to) identify input types based on form type. In these embodiments, the input classifier module 510 may select an input classifier model according to the form type of a given bundle. For example, the input classifier module 510 includes a set of models including a first input classifier model trained to identify input types of inputs in login forms (e.g., username and password fields), a second input classifier model trained to identify input types of inputs in signup forms, a third input classifier model trained to identify input types of inputs in change password forms, or some combination thereof, and the input classifier module 510 selects an input classifier model based on a form type of a bundle. Among other advantages, using models specifically configured to identify input types for a given form may result in more accurate input classifier models (since different form types tend to have different types of inputs). For example, login form types tend to have a single password field while change password form types tend to have multiple password fields (e.g., at least two to confirm the new password).

As mentioned above, an input classifier model may be machine learned. For example, an input classifier model is trained using labeled bundles with assigned form types. Specifically, the training data includes bundles of a given form type (e.g., login forms) where the inputs are labeled according to input type (e.g., username field and password field).

In some embodiments, the input classifier module 510 determines input types by analyzing HTML code associated with the bundle. For example, an attribute of an input field explicitly states or implies the input field is a password field. In another example, the input classifier module 510 performs regex matching to identify a username field or submit button.

After input types of a bundle are identified, the template generator module 504 may form a template (e.g., associated with a user and a webpage). The template may be stored in the template database 518.

In some embodiments, the template generator 504 generates a template based on an image of a user interface. For example, a client device 120 captures an image of a form in a user interface or in the external environment. The identifier module 502 may identify inputs in the image (e.g., via an object recognition image algorithm) and the template generator 504 may generate a template based on the image and the identified inputs.

The template applicator module 512 enables the autofill module 500 to automatically interact with a form. Specifically, the template applicator module 512 applies a template to one or more inputs of a form (e.g., webpage). For example, if a client device (e.g., associated with a user) accesses a webpage, the template applicator may determine whether any templates in the template database 518 are associated with the webpage (e.g., and the user). If so, the template applicator module 512 may apply that template to inputs of the webpage. Applying a template may include applying content to and selecting inputs based on input types of the inputs. The content to be applied to may be credentials stored in the credentials database 507 (or template database 518 in some embodiments).

In some cases, a template may include an error. For example, a template may specify an incorrect input type. Template errors may occur for any number of reasons. For example, a webpage may modify the location of an input in the webpage, modify an input type of an input, or add or remove an input, resulting in the previously established template becoming inaccurate. The error detection and correction (EDC) module 516 (also referred to as an error model) can identify an input error. For example, the EDC module 516 recognizes the webpage provided an error notification (e.g., "incorrect username or password"). In another example, the EDC module 516 identifies one or more inputs are missing content (e.g., a field input is empty). In another example, the EDC module 516 identifies an input in a form was modified relative to when the template was originally generated (e.g., the location of an input is modified, the input type of an input has changed, or the number of inputs has changed). Subsequent to (e.g., responsive to) detecting an input error, the EDC module 516 may generate a correction indication to correct the input error. The correction indication specifies a modification to be applied to the template. For example, the correction indication specifies that the template should be updated to add (or remove) an input with an input type. In another example, the correction indication specifies a change to an input or input type (e.g., change the input type from username to password field). The EDC module 516 may then update the template according to the correction indication. In some embodiments, a user may identify an input error type or specify the correction indication. In some embodiments, the EDC module 516 is machine learned to identify input errors and provide correction indications. For example, the EDC module 516 is trained using forms, incorrect templates for those forms, and corresponding correction indications to corrected those templates.

In some embodiments, the autofill module 500 includes an overlay module 514. The overlay module outputs an overlay on the form (e.g., webpage) that indicates identified inputs and input types specified by a template. Among other advantages, the overlay module 514 allows a user to identify input errors.

The template database 518 stores templates generated by the template generator module 504. Depending on the implementation, the template database 518 may store templates associated with a single user or multiple users. For example, if the autofill module 500 is stored on a client application 200 of a user's client device 120, the template database 518 may store templates associated with that user but if the autofill module 500 is stored on the content management system 100, the template database 518 may store templates associated with multiple users. As previously mentioned, the template database 518 and the credentials database 507 may be the same database in some embodiments.

In some embodiments, a template associated with a first user may be accessed or used by a second user (pending permissions by the first user). For example, the first user may enable the second user to use a template associated with a webpage or mobile application. Additionally, or alternatively, a modification to a template may be shared with or propagated to other templates (pending permissions by the first user). For example, if the EDC module 516 modifies a template associated with a webpage (e.g., to update the position of a password input in a form), that modification may be shared with or propagated to other templates associated with the same webpage.

Figures 6A, 6B:
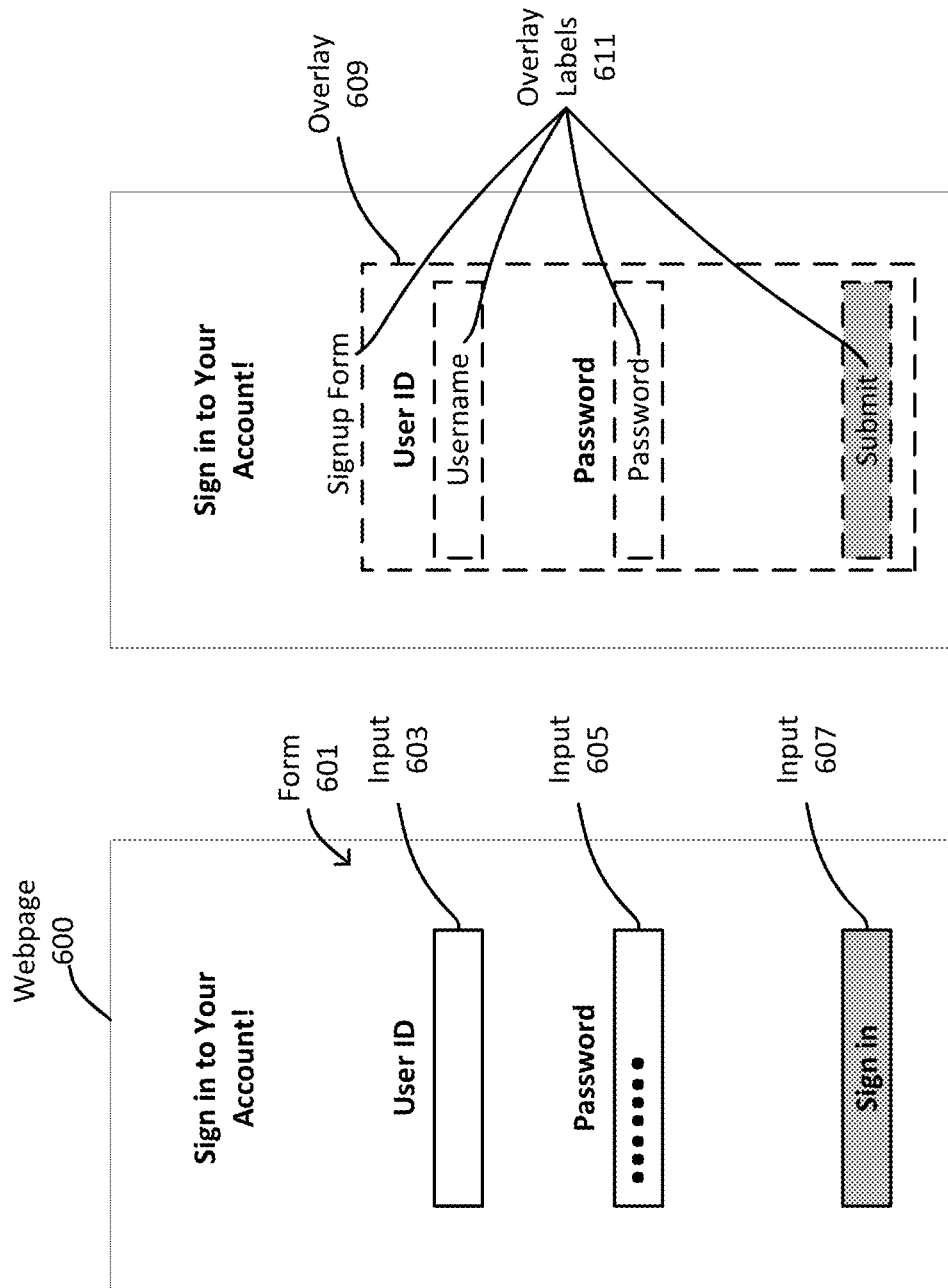
FIG. 6A illustrates is a webpage with a form that may be displayed on a client device, according to example embodiments.
FIG. 6B illustrates a webpage with an overlay interface, according to example embodiments.

FIG. 6A is an example webpage 600 with a form 601 that may be displayed on a client device. The form 601 includes inputs 603-607. As illustrated, the form 601 is a signup form, input 603 is a username field, input 605 is a password field, and input 607 is a submit button. As described with reference to FIG. 5, inputs 603-607 may be identified by the identifier module 502 and bundled together by the bundle module 506. After that, the bundle classifier module 508 may determine a form type for the bundle and the input classifier module 510 may determine input types for inputs 603-607. After that, the template generator module 504 may generate a template for the webpage 600 that specifies the input types of inputs 603-607.

FIG. 6B illustrates webpage 600 with an example overlay 609. The overlay may be displayed after a template is generated for a form. The overlay may be displayed by the client device so a user can view the inputs and input types specified by a template. In the example of FIG. 6B, each of the inputs 603-607 are highlighted using dashed rectangles and labels 611 are displayed to indicate the input types specified by the template. Additionally, the outer rectangle signifies the form and the label above the outer rectangle "signup form" indicates the form type specified by the template. Thus, by displaying the overlay, a user can identify the accuracy of the template. In the example, of FIG. 6B, the template is accurate. But if a template has an error, the overlay will help a user identify the error. The overlay may also enable the user to provide the error to correct the template. If one or more labels in an overlay are incorrect, the user interface with the overlay may enable a user to indicate the presence of an error and provide input to correct the error. For example, if the form type is incorrect (e.g., the label states the form is a signup form, but it is actually a sign in form), the user interface may allow the user to select the form type label and input the correct form type (e.g., via a drop down menu). In another example, if a single form is incorrectly classified as multiple forms, the user may identify this error via the overlay, indicate the error, and provide input to specify the presence of a single form instead of multiple forms. In another example, a user can select inputs and specify the input types if one or more input types are incorrect. In response a user providing input to correct an error, the EDC module 516 may update the template according to the user input so that future applications of the template will not result in the same error. As previously mentioned, if the EDC module 516 updates a template associated with a webpage, domain name, or mobile application to fix an error, the EDC module 516 may perform similar template updates to other templates associated with that webpage, domain name, or mobile application.

Figure 7:
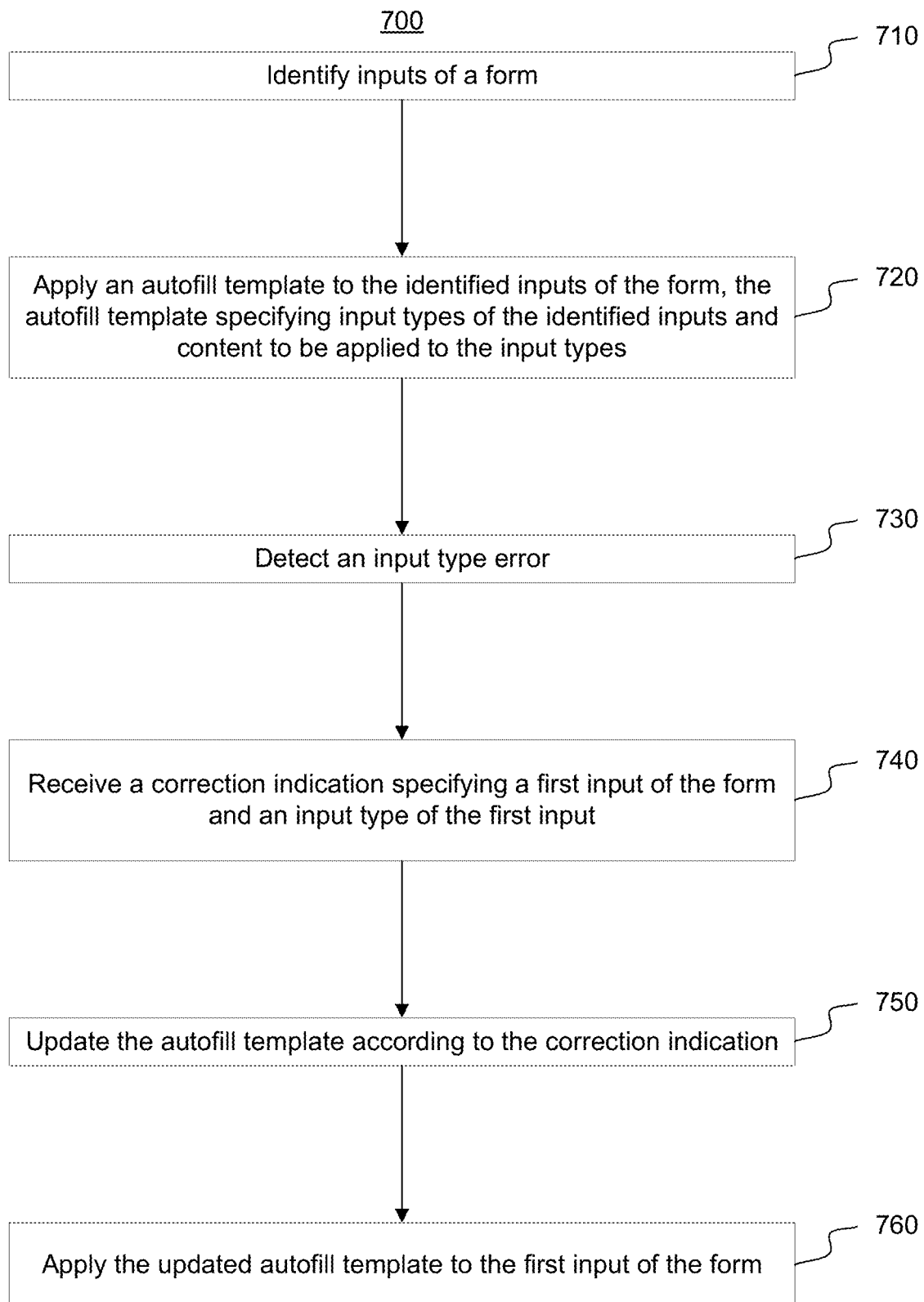
FIG. 7 is a flowchart of an example method for updating a template and applying the updated template to a webpage, according to example embodiments.

FIG. 7 is a flowchart of an example method 700 for updating a template and applying the updated template to a form (e.g., webpage). The method 700 may be performed by the autofill module 500.

At step 710, inputs of a form (e.g., webpage) are identified. The inputs may be identified by analyzing HyperText Markup Language (HTML) code of the form (e.g., webpage).

At step 720, an autofill template is applied to the identified inputs of the form (e.g., webpage). The autofill template specifies input types of the identified inputs and content to be applied to the input types. The content may include user profile information associated with the input types specified by the autofill template. In some embodiments, an input type specified by the template is a username input type or a password input type. The template may be generated by steps including at least one of: (1) identifying, by a machine learned input classifier model, input types of the identified inputs of the form (e.g., webpage); or (2) determining a form type of the identified inputs of the form (e.g., webpage), where the machine learned input classifier model is selected from a set of input classifier models based on the determined form type.

At step 730, an input error is automatically detected. The input type error may be detected by a machine learned error model.

At step 740, a correction indication is received or detected. The machine learned error model may provide the correction indication. The correction indication specifies a first input of the form (e.g., webpage) and an input type of the first input. Step 740 may be performed subsequent to (e.g., responsive to) step 730.

At step 750, the autofill template is updated according to the correction indication.

At step 760, the updated autofill template is applied to the first input of the form (e.g., webpage).

In some embodiments, the method further includes outputting an input overlay on the form (e.g., webpage), where the input overlay indicates the identified inputs and the input types as specified by the autofill template.

Figure 8:
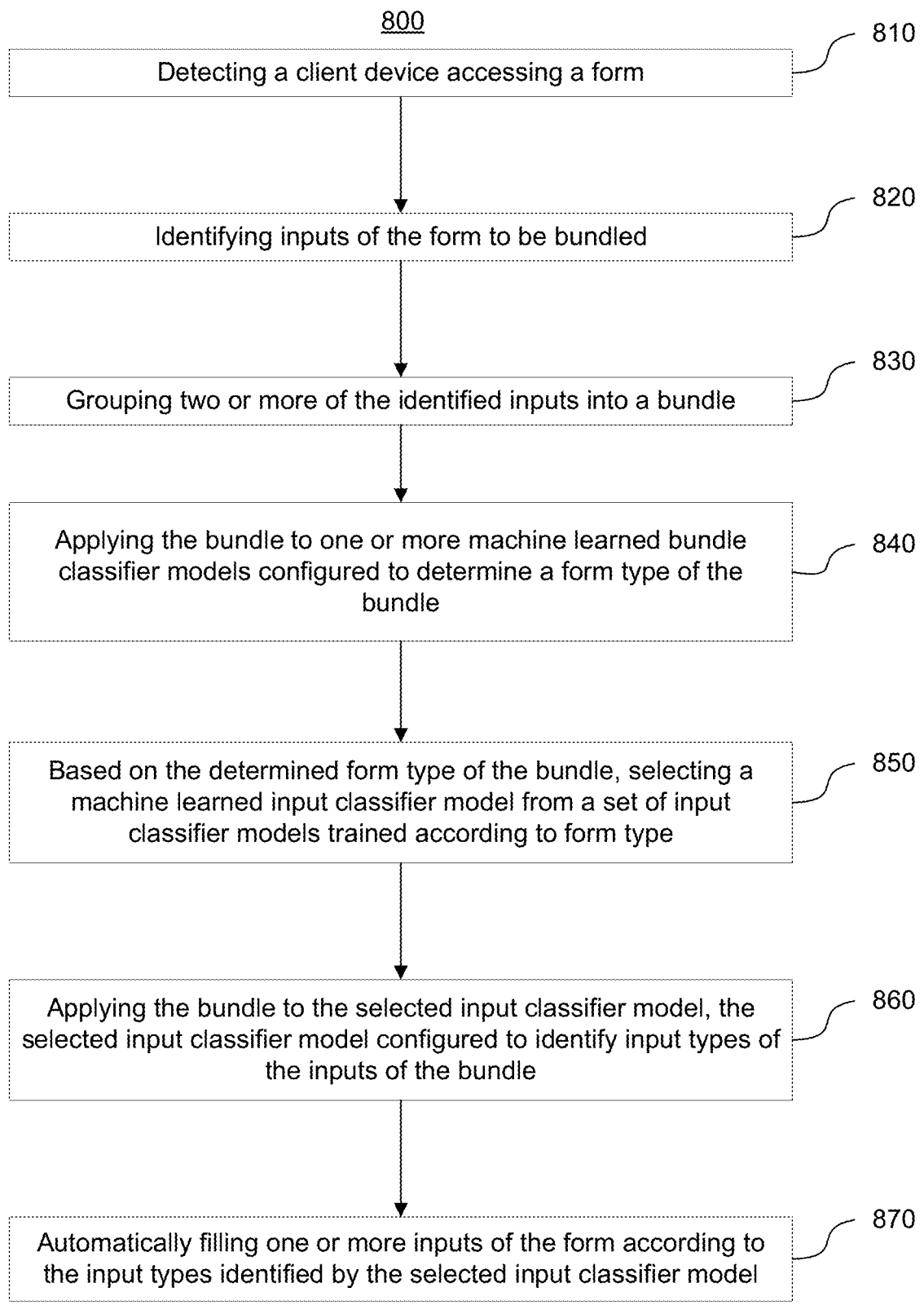
FIG. 8 is a flowchart of an example method for classifying webpage forms and inputs for password auto fill applications, according to example embodiments.

FIG. 8 is a flowchart of an example method for determining input types of a form (e.g., webpage). The method may be performed by the autofill module 500.

At step 810, a client device accessing a form (e.g., webpage) is detected.

At step 820, inputs of the form (e.g., webpage) are identified to be bundled. Identifying the inputs of the form (e.g., webpage) may include analyzing HyperText Markup Language (HTML) code of the webpage.

At step 830, two or more of the identified inputs are grouped into a bundle.

At step 840, the bundle is applied to one or more machine learned bundle classifier models. The one or more bundle classifier models are configured to determine a form type of the bundle. The one or more machine learned bundle classifier models may include one or more of: a first bundle classifier model trained to identify a login form type, a second bundle classifier model trained to identify a signup form, or a third bundle classifier model trained to identify a change password form type.

At step 850, (e.g., based on the determined form type of the bundle) a machine learned input classifier model is selected from a set of input classifier models that are trained (e.g., according to form type). The input classifier models in the set are configured to identify input types of the inputs in bundles. The set of input classifier models may include one or more of: a first input classifier model trained to identify input types of inputs in login forms, a second input classifier model trained to identify input types of inputs in signup forms, or a third input classifier model trained to identify input types of inputs in change password forms. In some embodiments, selecting the input classifier model is performed subsequent to (e.g., responsive to) step 840.

At step 860, the bundle is applied to the selected input classifier model to identify input types of inputs of the bundle. In one example, one of the inputs of the bundle is identified to be a username input type or a password input type.

At step 870, one or more inputs of the form (e.g., webpage) are automatically filled according to the input types identified by the selected input classifier model. Automatically filling the one or more inputs of the form (e.g., webpage) may be performed subsequent to (e.g., responsive to) the selected input classifier model identifying the input types of the one or more inputs of the form (e.g., webpage). In some embodiments, filling the one or more inputs of the form (e.g., webpage) includes retrieving user profile information associated with the identified input types of the input of the bundle and providing the retrieved user profile information to the one or more inputs of the form (e.g., webpage).

In some embodiments, the method 800 further includes one or more of: (1) receiving a correction indication specifying an input type error of a first input of the bundle, the input type error automatically determined by an error detection model; (2) updating the input type of the first input; or (3) automatically filling the first input of the form (e.g., webpage) according to the updated input type.

Additional Considerations

The systems and methods described herein, among other things, achieve an advantage of an improved user interface, in that the annotation objects described herein improve display area utilization. By use of annotation objects, auxiliary content can be embedded in-line with text and other objects of a collaborative content item in a manner that neither clutters the collaborative content item, nor requires diversion of a user's attention away from the user's area of focus. Moreover, while embedded in-line, the ability to toggle secondary collaborative content items signified by annotation objects ensures that the annotation objects keep auxiliary content accessible, while hidden when unneeded.

Reference in the specification to "one embodiment" or to "example embodiments" means that a particular feature, structure, or characteristic described in connection with the example embodiments is included in at least one embodiment. The appearances of the phrase "in one embodiment" in various places in the specification are not necessarily all referring to the same embodiment.

In this description, the term "module" refers to a physical computer structure of computational logic for providing the specified functionality. A module can be implemented in hardware, firmware, and/or software. In regards to software implementation of modules, it is understood by those of skill in the art that a module comprises a block of code that contains the data structure, methods, classes, header and other code objects appropriate to execute the described functionality. Depending on the specific implementation language, a module may be a package, a class, or a component. It will be understood that any computer programming language may support equivalent structures using a different terminology than "module."

It will be understood that the named modules described herein represent one embodiment of such modules, and other example embodiments may include other modules. In addition, other example embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of a system, loaded into memory, and executed by the one or more processors of the system's computers.

The operations herein may also be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including optical disks, CD-ROMs, read-only memories (ROMs), random access memories (RAMs), magnetic or optical cards, or any type of media suitable for storing electronic instructions, and each coupled to a computer system bus. Furthermore, the computers referred to in the specification may include a single processor or may be architectures employing multiple processor designs for increased computing capability.

The algorithms presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present technology is not described with reference to any particular programming language. It will be appreciated that a variety of programming languages may be used to implement the teachings of the present technology as described herein, and any references above to specific languages are provided for disclosure of enablement and best mode of the present technology.

While the technology has been particularly shown and described with reference to a preferred embodiment and several alternate example embodiments, it will be understood by persons skilled in the relevant art that various changes in form and details can be made therein without departing from the spirit and scope of the technology.

As used herein, the word "or" refers to any possible permutation of a set of items. Moreover, claim language reciting 'at least one of' an element or another element refers to any possible permutation of the set of elements.

Although this description includes a variety of examples and other information to explain aspects within the scope of the appended claims, no limitation of the claims should be implied based on particular features or arrangements these examples. This disclosure includes specific example embodiments and implementations for illustration, but various modifications can be made without deviating from the scope of the example embodiments and implementations. For example, functionality can be distributed differently or performed in components other than those identified herein. This disclosure includes the described features as non-exclusive examples of systems components, physical and logical structures, and methods within its scope.

Finally, it should be noted that the language used in the specification has been principally selected for readability and instructional purposes, and may not have been selected to delineate or circumscribe the inventive subject matter. Accordingly, the disclosure of the present technology is intended to be illustrative, but not limiting, of the scope of the technology, which is set forth in the following claims.

What is claimed is:

1. A method comprising:
   detecting a client device accessing a webpage;
   identifying inputs of the webpage to be bundled;
   grouping two or more of the identified inputs into a bundle;
   applying the bundle to one or more machine learned bundle classifier models trained to identify at least one of a login form type, a signup form type, or a change password form type, and configured to determine a form type of the bundle;
   based on the determined form type of the bundle, selecting a machine learned input classifier model from a set of input classifier models trained to identify the form type;
   applying the bundle to the selected machine learned input classifier model, the selected machine learned input classifier model configured to identify input types of the inputs of the bundle; and
   automatically filling one or more inputs of the webpage according to the input types identified by the selected machine learned input classifier model.

2. The method of claim 1, wherein the one or more machine learned bundle classifier models include a first bundle classifier model trained to identify a login form type, a second bundle classifier model trained to identify a signup form, and a third bundle classifier model trained to identify a change password form type.

3. The method of claim 1, wherein the set of input classifier models includes a first input classifier model trained to identify input types of inputs in login forms, a second input classifier model trained to identify input types of inputs in signup forms, and a third input classifier model trained to identify input types of inputs in change password forms.

4. The method of claim 1, wherein a first input of the bundle is identified by the selected machine learned input classifier model to be a username input type.

5. The method of claim 1, wherein a first input of the bundle is identified by the selected machine learned input classifier model to be a password input type.

6. The method of claim 1, wherein grouping the two or more of the identified inputs into the bundle is performed by a machine learned grouping model.

7. The method of claim 1, wherein identifying the inputs of the webpage comprises analyzing HyperText Markup Language (HTML) code of the webpage.

8. The method of claim 1, wherein automatically filling the one or more inputs of the webpage is performed responsive to the selected machine learned input classifier model identifying the input types of the one or more inputs of the webpage.

9. The method of claim 1, wherein selecting the machine learned input classifier model is performed responsive to determining the form type of the bundle.

10. The method of claim 1, further comprising:
    receiving a correction indication specifying an input type error of a first input of the bundle, the input type error automatically determined by an error detection model;
    updating the input type of the first input; and
    automatically filling the first input of the webpage according to the updated input type.

11. The method of claim 1, wherein filling the one or more inputs of the webpage comprises retrieving user profile information associated with the identified input types of the inputs of the bundle and providing the retrieved user profile information to the one or more inputs of the webpage.

12. A non-transitory computer-readable storage medium storing executable computer instructions that, when executed by one or more processors, cause one or more processors to perform operations comprising:
    detecting a client device accessing a webpage;
    identifying inputs of the webpage to be bundled;

grouping two or more of the identified inputs into a bundle;
applying the bundle to one or more machine learned bundle classifier models trained to identify at least one of a login form type, a signup form type, or a change password form type, and configured to determine a form type of the bundle;
based on the determined form type of the bundle, selecting a machine learned input classifier model from a set of input classifier models trained to identify the form type;
applying the bundle to the selected machine learned input classifier model, the selected machine learned input classifier model configured to identify input types of the inputs of the bundle; and
automatically filling one or more inputs of the webpage according to the input types identified by the selected machine learned input classifier model.

13. The non-transitory computer-readable storage medium of claim 12, wherein the one or more machine learned bundle classifier models include a first bundle classifier model trained to identify the login form type, a second bundle classifier model trained to identify the signup form, and a third bundle classifier model trained to identify the change password form type.

14. The non-transitory computer-readable storage medium of claim 12, wherein the set of input classifier models includes a first input classifier model trained to identify input types of inputs in login forms, a second input classifier model trained to identify input types of inputs in signup forms, and a third input classifier model trained to identify input types of inputs in change password forms.

15. The non-transitory computer-readable storage medium of claim 12, wherein a first input of the bundle is identified by the selected machine learned input classifier model to be a username input type.

16. The non-transitory computer-readable storage medium of claim 12, wherein a first input of the bundle is identified by the selected machine learned input classifier model to be a password input type.

17. A system comprising:
one or more processors; and
a computer-readable storage medium storing executable computer instructions that, when executed by the one or more processors, cause the one or more processors to perform operations comprising:
detecting a client device accessing a webpage;
identifying inputs of the webpage to be bundled;
grouping two or more of the identified inputs into a bundle;
applying the bundle to one or more machine learned bundle classifier models trained to identify at least one of a login form type, a signup form type, or a change password form type and configured to determine a form type of the bundle;
based on the determined form type of the bundle, selecting a machine learned input classifier model from a set of input classifier models trained to identify the form type;
applying the bundle to the selected machine learned input classifier model, the selected machine learned input classifier model configured to identify input types of the inputs of the bundle; and
automatically filling one or more inputs of the webpage according to the input types identified by the selected machine learned input classifier model.

18. The system of claim 17, wherein the one or more machine learned bundle classifier models include a first bundle classifier model trained to identify the login form type, a second bundle classifier model trained to identify the signup form, and a third bundle classifier model trained to identify the change password form type.

19. The system of claim 17, wherein the set of input classifier models includes a first input classifier model trained to identify input types of inputs in login forms, a second input classifier model trained to identify input types of inputs in signup forms, and a third input classifier model trained to identify input types of inputs in change password forms.

20. The system of claim 17, wherein a first input of the bundle is identified by the selected machine learned input classifier model to be a username input type.

\* \* \* \* \*